US006554207B2

(12) United States Patent
Ebberts

(10) Patent No.: US 6,554,207 B2
(45) Date of Patent: Apr. 29, 2003

(54) APPLICATION APPARATUS FOR MULTIPLE SOLUTION CLEANER

(76) Inventor: Jeffrey N. Ebberts, 711 Rosewood St., Ardmore, OK (US) 73401

( * ) Notice: Subject to any disclaimer, the term of this patent is extended or adjusted under 35 U.S.C. 154(b) by 15 days.

(21) Appl. No.: 09/812,503

(22) Filed: Mar. 20, 2001

(65) Prior Publication Data

US 2001/0035467 A1 Nov. 1, 2001

Related U.S. Application Data

(60) Provisional application No. 60/190,106, filed on Mar. 20, 2000.

(51) Int. Cl.[7] ................................................ A01G 25/09

(52) U.S. Cl. .................... 239/146; 239/373; 222/145.5; 222/399

(58) Field of Search ................................ 239/135, 137, 239/146, 346, 337, 340, 407, 413, 373; 222/145.5, 608, 399, 146.5; 134/36, 42, 94.1

(56) References Cited

U.S. PATENT DOCUMENTS 748,971 A 1/1904 Millspaugh
4,135,669 A * 1/1979 Bridges et al. ............. 239/146
4,219,333 A 8/1980 Harris
5,016,817 A 5/1991 Ghate et al.
5,180,439 A 1/1993 Allison
5,244,468 A 9/1993 Harris et al.
5,593,091 A 1/1997 Harris
5,624,465 A 4/1997 Harris
5,718,729 A 2/1998 Harris
5,867,860 A 2/1999 Harris
5,937,628 A 8/1999 Matechuk
6,016,973 A 1/2000 Thompson et al.
6,126,697 A 10/2000 Ebberts

* cited by examiner

*Primary Examiner*—Lisa A. Douglas
(74) *Attorney, Agent, or Firm*—James F. Harvey, III

(57) ABSTRACT

A pressurized system for the preparation and mixing of two or more component solutions comprising a cleaning solution to produce a prepared cleaning solution for use with various applicators in common use in the cleaning industry. The system is made up of a mobile frame for supporting a plurality of pressurized tanks which are connected through feed lines to a mixing tee fitting to produce the output mixed cleaning solution. An inline heater can be optionally added in one or more of the feed lines to provide heat to the component solution before mixing, and an inline heater can be optionally added after mixing to heat the prepared solution. Pressure is supplied to the system by an air compressor directly connected to each of the pressurized tanks so that the same pressure is applied to all tanks. Pressure is maintained in the system when changing tanks by use of liquid disconnects between the feed lines and the output valves of the tanks, gas disconnects between the compressed air line and the input valves of the tanks, and quick disconnects at all points where solutions may be extracted from the system. This allows easy removal and exchange for any solution tank without disrupting the solution flow through the system and further eliminates the need to drain solution tanks and purge solution lines. The system is composed of inexpensive parts commonly found in industry and is used in both residential and commercial applications for cleaning carpet, upholstery, drapes, and other such textile surfaces.

19 Claims, 3 Drawing Sheets

APPLICATION APPARATUS FOR MULTIPLE SOLUTION CLEANER

CROSS-REFERENCES TO RELATED APPLICATIONS

This patent application claims priority based upon the following provisional patent application: No. 60/190,106, filed on Mar. 20, 2000.

BACKGROUND OF THE INVENTION

The current invention relates to an apparatus which combines two or more separate reactive solutions within a base unit, with or without additional heating of the combined solution, for presentation to a cleaning applicator connected to the base unit for remote application to a surface to be cleaned.

The use of cleaning agents to remove soil, oils, and other stains from textiles in the form of carpet and upholstery is well known. The vast majority of these cleaning agents are composed of soaps and other detergents which are generally referred to as "surfactants." A surfactant is defined as a synthetic, water soluble, amphipathic molecule which has a large non-polar hydrocarbon end and a polar end. Typically, a composition of this kind is premixed by adding the components to a common solution tank beforehand, where they are mixed and held until they are applied to the textile surface by an applicator.

Other compositions derive their cleaning properties from the fact that they are self-carbonating. They may be held in separate containers and, immediately before they are applied, are mixed to produce carbon dioxide. Some are mixed on the surface to be cleaned. Each component may be pre-heated before mixing or the combination may be heated after mixing, in order to increase solution reactivity. One example of such self-carbonating cleaners is found in U.S. Pat. No. 5,244,468, issued on Sep. 14, 1993, to Harris, in which a solution consisting of a carbonate salt, an acid, and urea is prepared in a single pressurized container at a gauge pressure of from about 0.5 to 15 atmospheres. Another example is found in U.S. Pat. No. 5,718,729, issued on Feb. 17, 1998, to Harris, in which a carbonate salt solution and an acid solution are separately heated and both directly applied to a textile surface where they react to form a carbonating solution which effervesces and cleans the textile fibers. Still another example is found in U.S. Pat. No. 5,624,465, issued on Apr. 29, 1997, to Harris, in which separate solutions of a carbonate salt and an acid are heated at ambient pressure and combined to produce a carbonating cleaning solution. U.S. Pat. No. 6,126,697, issued on Oct. 3, 2000, to Ebberts, describes combining two different carbonate salts and an acid under pressure to produce a carbonating cleaning solution.

Many types of application systems have been developed for preparing these multiple component solutions and then applying the prepared solution to various types of textiles. Such preparation by a base unit may consist of heating the components of the solution (either separately or together after mixing), mixing the components, adding optional agents, and pumping the solution to the applicator under pressure. Application by an applicator may consist of bringing the solution into close proximity to the textile; adding specialty preparations such as scents or disinfectants; spraying the solution onto the fabric as a fine spray or sheet of liquid; removal of excess liquid after it has been in contact with the textile; or scrubbing the textile surface while the solution is on the surface by means of brushes which are activated either manually, by the pressure of the cleaning solution, or by means of motors. Applicators featuring various combinations of these activities have been developed by many different manufacturers.

Those application systems adapted for application of a single, premixed solution use a system of centrifugal or diaphragm pumps contained in the base unit to deliver the prepared solution to the applicator. Many such systems have a 'Y' connection in the line containing the prepared solution, which allows two technicians to use the same prepared solution and work from the same base unit at the same time; however, several different systems must be employed when each technician requires use of a different prepared solution. Other types of application systems produce a prepared solution by combining multiple cleaning solution components at the job site and applying the result under pressure to the textile surface.

One system for the preparation and application of a multiple component cleaner is described in U.S. Pat. No. 5,593,091, issued Jan. 14, 1997, to Harris. It describes an application system consisting of a base unit for heating two or more solutions and presenting each heated solution in a separate line under pressure to an applicator, where each line is connected to a common mixing chamber in the proximal end of the applicator. Each container is adapted for holding a heated solution at a desired temperature. One or more pumps are used for the delivery of the solution from each container through separate lines to the applicator. The solutions are mixed in a mixing chamber which features special baffles for thorough agitation and mixing of the components to ensure complete reaction between the components to produce carbonation. The resulting carbonated prepared solution is applied to a textile surface through a manifold in the distal end of the applicator which is immediately proximate to the textile surface.

Another, much older, mixing and spraying apparatus is found in U.S. Pat. No. 748,971, issued on Jan. 5, 1904, to Millspaugh, which describes a system consisting of a pair of air-tight tanks holding different liquids, an air pump having free connection with both tanks so as to exert equal pressures on the two liquids, an outlet hoses from each tank having a junction to a common discharge pipe, and a means for regulating the flow of each liquid by inserting one of a set of disks having different diameter holes into the flow. Proportional mixing of the liquids is accomplished by using disks with dissimilar holes. Hand controlled valves are provided between each system component for cutting off the flow of liquid, with a check valve being provided in common air pump line to prevent backflow into the air pump.

However, it has been found that these systems and methods for combining multiple component solutions for cleaning textiles, with or without preheating the component solutions, have certain disadvantages. First, it can be necessary to change out containers so that a prepared solution containing different components may be used in the base unit. This is necessary when, for example, a strong cleaning solution for use on commercial carpets must be replaced by a different solution for cleaning fine upholstery fabric that would be susceptible to heat damage, fading, shrinkage or discoloration. Sometimes the application system must be completely drained and purged to ensure no residue of the previous solution remains in the recirculating hoses, injectors, mixing chamber, applicator, etc. Such a drain and purge operation would be necessary when changing, for example, from a detergent to a solvent. This is done for either because a small amount of the detergent residue may damage some upholstery fabrics or because a mixture of detergent and solvent will solidify and thus plug the pumps, hoses, and applicators. This drain and purge process can be time consuming and removes the application system from service.

Second, those existing systems which generally employ a heating and/or pressurization process for the component containers are cumbersome and complicated. A pump in the base unit is used to pump a liquid solution, either a component to be mixed or a premixed solution, from its container for presentation under pressure to the applicator. Two separate pumps are generally used when two containers are involved where the solutions contained therein must be kept separate until they are mixed. For example, self-carbonating cleaners requiring mixture of a strong acidic solution and a strong carbonate salt solution held in two separate containers must be kept separate and mixed under certain conditions to take advantage of the self-carbonating action which results. However, it is difficult to maintain a consistent, equal pressurization from two separate pumps because of variations in manufacture and wear of the pumps over time. The problem is further compounded when one or both of the component solutions must be heated. Each component solution is heated separately and then pumped to the mixing chamber. In order to heat the separate components, each solution is recirculated through heating elements and held in a non-pressurized container. These pumps work independently and when demand is required at the applicator, each component solution is pumped from the container to the applicator by its respective pump. The carbonating effect and the pH level of the prepared cleaner depend upon the two solutions being equally metered. Getting both pumps to pump solution equally, over time, has proven to be a major handicap and liability to such systems.

Third, existing systems require the use of special, custom containers containing heaters and connections. The method of heating component solutions is often cumbersome. The containers may contain heating units consisting of a simple element or a series of coils through which the solution passes, the coils being a part of the container itself. Such containers are generally more difficult to obtain since they are specialized and not commonly used, and they are sold at higher prices from single sources because of their uniqueness. Some systems may require recirculating lines to keep each of the solutions at a constant temperature, whereby the recirculating lines extend from the container in the base unit to the applicator where a portion of the solution is expended, with the remainder being circulated back again to the base unit for reheating, thus doubling the hose structure and making the system cumbersome and awkward for the technician to manipulate. Excessive hoses are especially troublesome in a residential setting where they may knock or overturn household objects.

Fourth, the placement of the mixing means in the applicator, such as is done in U.S. Pat. No. 5,593,091, precludes the base unit from being used with certain types of applicators. A number of third party manufacturers make applicators having only a single input line. In order to use a base unit built for preparation of a multiple component cleaner, a third accessory for mixing the two components would be necessary in order to use an applicator having a single input line. Therefore, a base unit without a mixing means precludes the use of single line applicators, and it would be desirable to provide a base unit which could accept a broad range of applicators in order to adapt the base unit for more uses.

Therefore, what is needed is a general purpose base unit having the following properties:

1. capability of being rapidly drained and purged when changing from one solution to a different solution.
2. equal pressurization of all component containers by use of a single, common pressurization source.
3. a simple method of heating component solutions which does not require special heating means for containers nor recirculation hoses.
4. capability of being used with a wide range of different applicators, each applicator requiring either dual input lines or a single input line.
5. independent use of the containers in the system by separate applicators.

It would further be desirable to construct such an application system from standard, off-the-shelf parts which are inexpensive and easily obtainable.

SUMMARY OF THE INVENTION

It is therefore an object of the present invention to provide a means for mixing two or more separate solutions in separate containers for presentation of the mixture to an applicator to clean a surface.

It is a further object of this invention to provide an application system whereby the contents of two containers containing an acid solution and a multiple carbonate solution are combined in equal volumetric amounts in an unheated environment for application to a soiled textile surface.

It is a further object of this invention to enable two or more workers to utilize the same application system where each worker requires the same prepared cleaning solution resulting from the mixture of two or more separate components.

It is a further object of this invention to enable two or more workers to utilize the same application system where each worker requires use of a different single, premixed solution contained in a container of the system.

It is a further object of this invention to provide a method of delivery that will assure equal pressure will be maintained in all lines and applicators, thus ensuring a consistent and safe mixture of chemicals and solutions.

It is a further object of this invention to provide an application system which provides cleaning product under pressure through use of a single compressor applying equal pressure to all containers in the system.

It is a further object of this invention to provide a prepared cleaning solution which is heated without use of special containers.

It is a further object of this invention to provide heated component solutions by means of individual inline heaters for each component solution.

It is a further object of this invention to provide an application system whereby solution containers can be easily and efficiently changed without undue effort required to clean and purge the application system.

It is a further object of this invention to provide a compact application system that two or more technicians can use simultaneously on different textiles and at different locations.

It is a further object of this invention to provide a compact application system that permits two or more technicians to use different solutions in different tanks independently and simultaneously.

It is a further object of this invention to provide an application system that may be assembled from standard parts for more economical use and maintenance.

It is a further object of this invention to provide a means whereby self carbonated cleaning compounds, such as the compound described in U.S. Pat. No. 6,126,697, comprised as two separate solutions and stored in different containers, may be mixed upon demand in such a manner that the mixed solution remains in the system, under pressure, preserving the carbonating effect to a high degree, even when the pressure is released in other parts of the system, or the solution tanks are removed and replaced or the compressor is disconnected.

These and other objects of the invention may be more clearly seen from the detailed description of the preferred embodiment which follows.

The present invention consists of a cleaning apparatus serving as a general base unit for use with a number of single- and dual-line applicators available in the commercial marketplace. The invention consists of one or more standard containers capable of maintaining a liquid solution under pressure and mounted on a mobile base for easy transportation from place to place during a cleaning operation. The solutions held by the containers are supplied under pressure to a mixing means, normally consisting of a standard tee connector commonly found in most supply houses, for a one-to-one mixture of the solutions. Mixing of two component solutions is accomplished by supplying each solution under pressure to opposed ports of the tee with the resulting mixed solution flowing out the middle port. This arrangement provides thorough mixing of the component solutions without use of special baffles or manifolds in the mixing means.

The invention eliminates the use of liquid pumps to achieve pressurized flow of cleaning solution. Instead, a single compressor is used to apply a constant pressure to each container via a common compression line connected to a gas disconnect on each container. Constant equal pressure is maintained throughout all hardware components of the system by use of valves in the form of quick disconnects at all connection points of the system. A blow-by valve for bleeding excess pressure is used with the compressor to prevent pressure from exceeding a given value and thus causing damage to the system. With a standard tee connector, a compressor can be used to pressurize the system which causes an even and equal pressure in all tanks, lines, and tee connectors.

Because of the pressurization of the system, it can be used for limited lengths of time in areas where power for the compressor is unavailable. This capability is also useful when the power requirements of the equipment being used in the cleaning process, e.g. vacuums, heaters, rotary brush attachments, compressors, etc., exceed that which is available at the work site. Such a situation is sometimes encountered in residential settings where heaters for large amounts of hot water and the motors of individual tools place too much of a load on residential power capacity. The compressor may be turned on for short periods of time and the invention operated from its residual pressurization when simultaneous use of the invention and other power equipment is required.

Each container is of a standard design normally found in the beverage industry, having a gas disconnect for pressurization and a liquid disconnect for the output of solution under pressure. Containers are rapidly changed within the base unit by disconnecting the compression line and the liquid line, lifting the container free of the base unit, and then replacing with another container containing the desired solution. The compression and liquid lines are then reconnected and the system is repressurized. The small amount of solution that remains in the feed lines is expelled and work is ready to resume. One-directional check valves are provided on each feed line between the tank and the mixing means to prevent inadvertent backflow of the contents one tank into the other tank.

When heating of component solutions is required, an optional inline heater is used to heat the pressurized solution as it exits the container and before it reaches the mixing means. Such a mechanism eliminates the need for recirculation hoses and specialty heating containers. The containers can be configured for individual operation by inserting a tee connector with a quick disconnect in each feed line between the container and the mixing means, so that additional applicators can be attached to the individual feed line of each container before their contents are mixed. Such a mode of operation might be useful, for example, when a hot cleaner is to be used, followed by application of cold water to rinse the cleaned surface. The invention would be configured with one container filled with water and the other container filled with cleaner. An inline heater would be configured in the feed line for the container filled with cleaner. A first applicator would be connected to the tee and quick disconnect in the cleaner feed line, a second applicator would be connect to the tee and quick disconnect in the cold water line, and the output from the mixing means would be left vacant. The invention would allow both applicators to be used simultaneously by different operators, or they could be used sequentially by the same operator without attachment and reattachment of applicators. Furthermore, backflow between the two tanks would be prevented by the presence of the check valves. Other similar examples of such flexible use are readily apparent from an examination of the invention.

BRIEF DESCRIPTION OF THE DRAWINGS

The prior objects and advantages of the invention will become evident upon examination of the following detailed description presented in conjunction with the drawings, in which.

DETAILED DESCRIPTION OF THE PREFERRED EMBODIMENT

Figure 1:
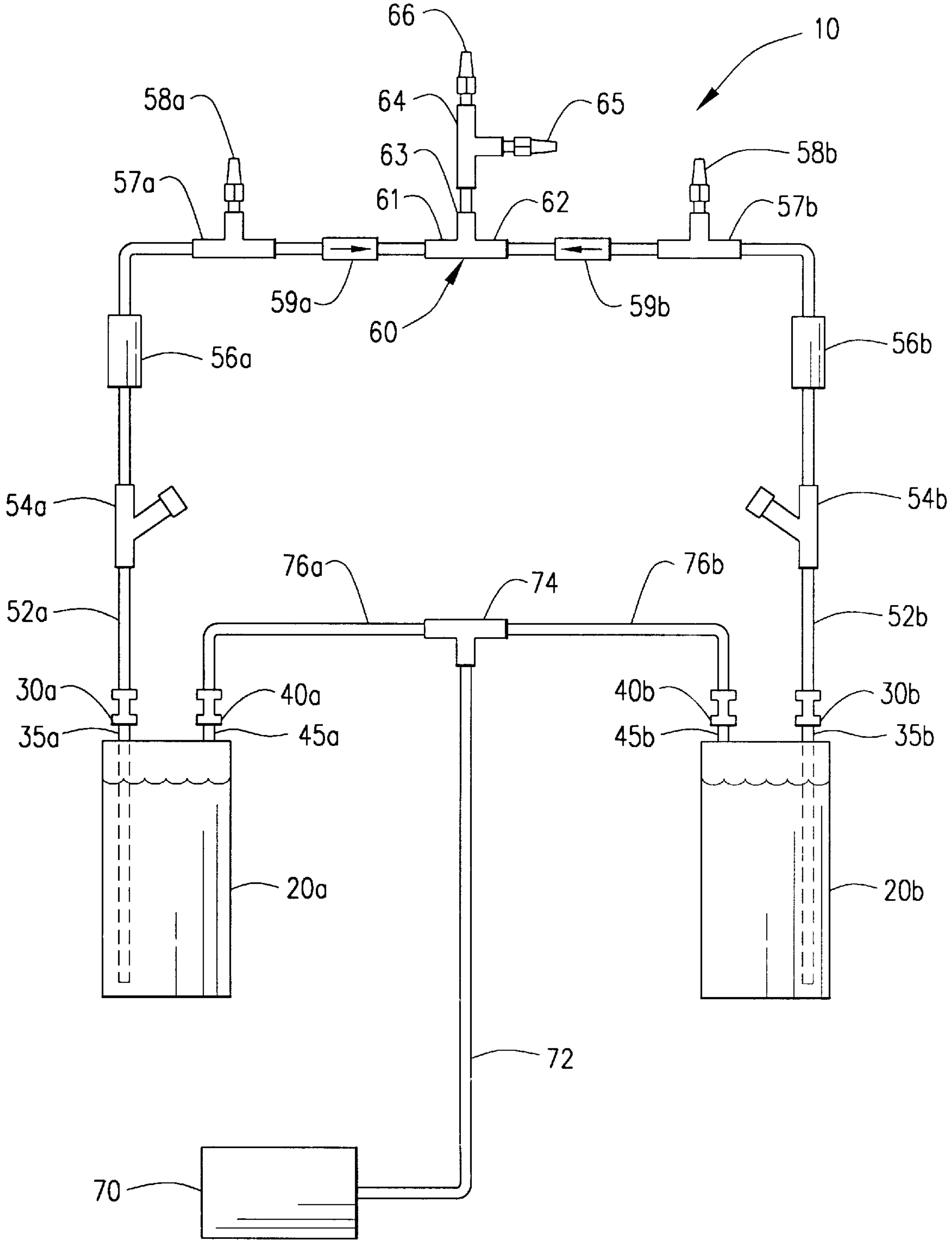
FIG. 1 shows an a schematic diagram of the connection of all components of the application system for preparing and mixing a multiple component cleaning solution.
Figure 2:
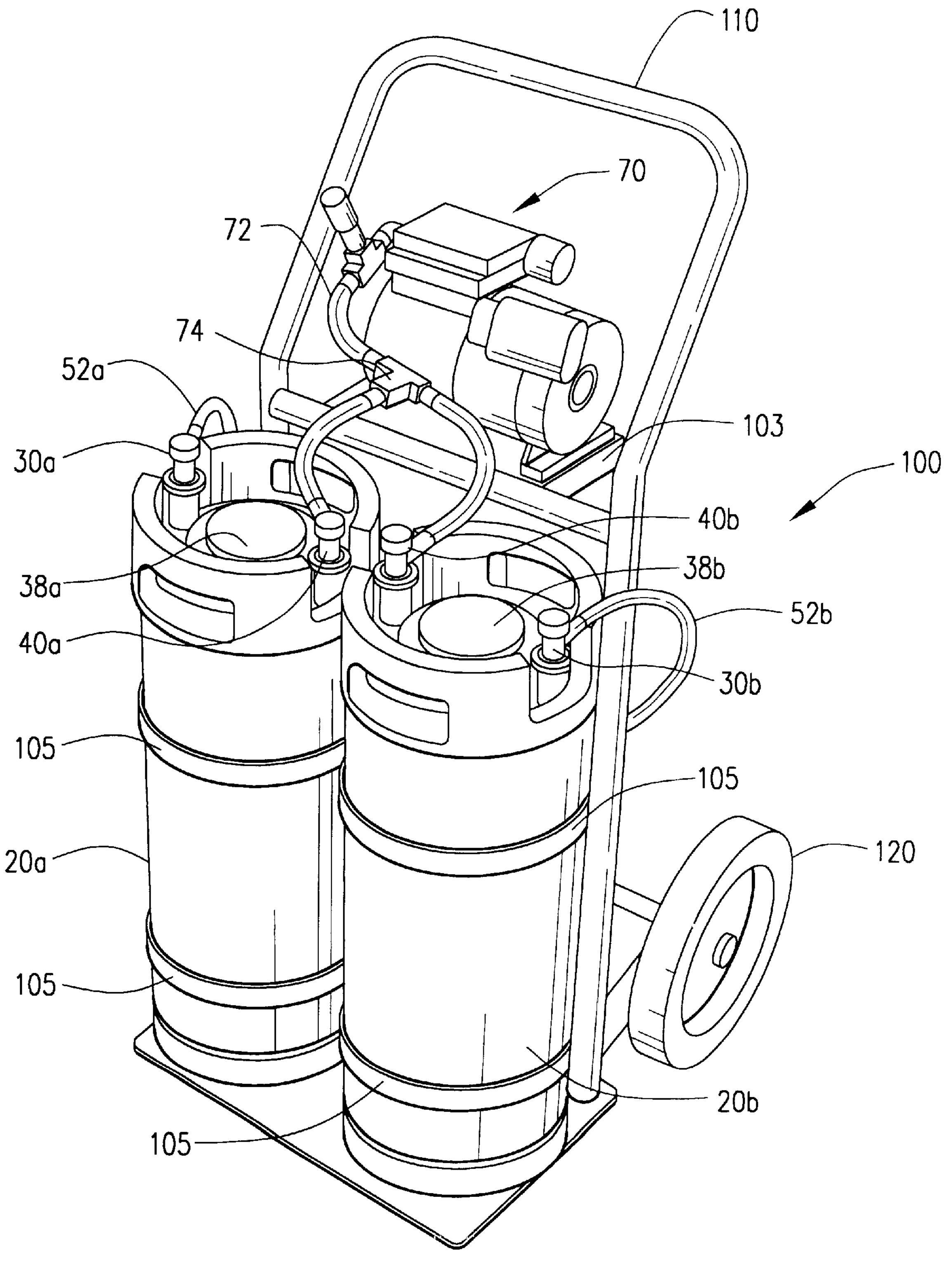
FIG. 2 shows the front view of the preferred embodiment of the invention.
Figure 3:
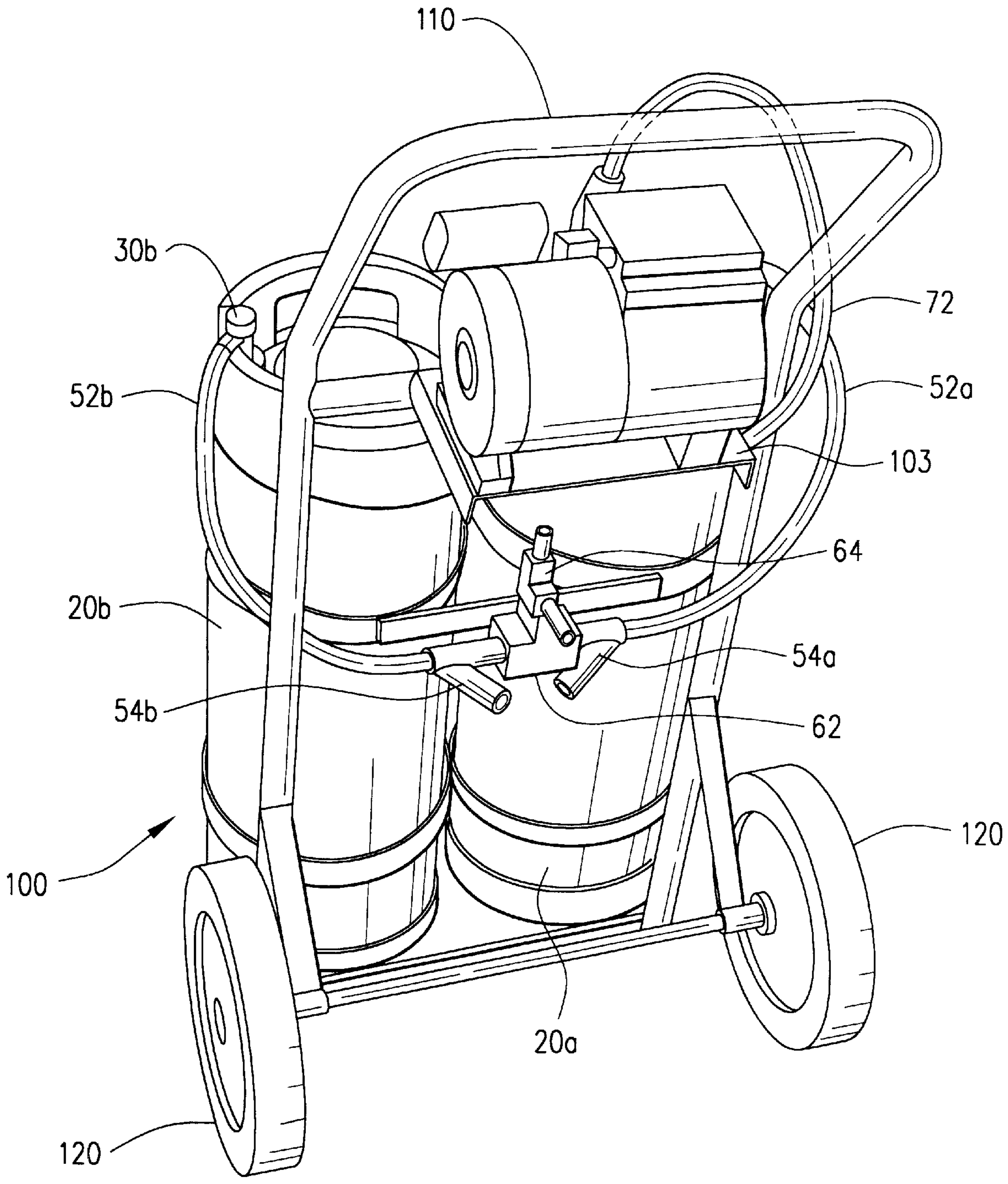
FIG. 3 shows the rear view of the preferred embodiment of the invention.

FIG. 1 presents a schematic view of the logical layout of the application system for preparing and mixing a two component cleaner for use in cleaning carpet and upholstery, while FIGS. 2 and 3 give a front and rear view, respectively, of an embodiment of the apparatus without several optional components. With reference to FIG. 1, a schematic view of the cleaning solution application system 10 is shown for mixing a two component cleaning solution. The two component solutions are contained in tanks 20*a*, 20*b*, which are of a standard design well known to the industry. The preferred embodiment is a five gallon stainless steel tank as is commonly found in the beverage industry, each tank having in its top surface a liquid outlet valve 35*a*, 35*b*, gas inlet valve 45*a*, 45*b*, and a pressurized lid 38*a*, 38*b* (FIG. 2) for filling the tank. Although five gallon tanks are considered to be optimal for commercial use of the invention, three gallon tanks can also be used for tasks requiring a more compact configuration.

Referring to FIGS. 2 and 3, tanks 20*a*, 20*b* are secured to frame 100 by means of straps 105 or other suitable means.

Straps 105 are configured according to standards methods commonly known in the industry, so that tanks 20a, 20b may be easily removed from frame 100 for refilling or replacement. Frame 100 has a set of wheels 120 so that it is easily transportable and guided by a handle 110.

Referring again to FIG. 1, compressor 70 provides pressurized air through main line 72 connected to one of the ports on tee 74 for distribution to tanks 20a, 20b. The choice of port is irrelevant for purposes of compressed air distribution; air tee 74 could be replaced by a "Y" fitting without changing the functionality of the junction. Air feed lines 76a, 76b connect air tee 74 to gas disconnects 40a, 40b, which in turn are removably connected to input valves 45a, 45b on respective tanks 20a, 20b. Gas disconnects 40a, 40b are of standard design with a ¼" flare inlet and are commonly used with tanks 20a, 20b in the beverage industry. They are designed to cut off flow of gas, in this case compressed air, when they are disconnected from a valve, so as to maintain pressure within a system. Each component solution contained in tanks 20a, 20b is forced by compressed air entering tanks 20a, 20b to exit its respective tank through liquid outlet valve 35a, 35b. Compressor 70 is of common design for providing approximately 70 pounds of pressure to tanks 20a, 20b. It is provided with a means for regulating pressure (not shown) to prevent damage to the system. Various forms of pressure regulators and blow-by valves can be used for this purpose, but the preferred mechanism is a blow-by valve because of its simplicity and low expense. The compressor 70 is mounted on platform 103 (FIG. 2) which is rigidly supported by frame 100. Compressor 70 can be powered by electricity, gasoline, or other suitable means, but it is preferably electrically powered.

The feed means which conveys component solutions from the tanks to the mixing means is coupled to liquid output valves 35a, 35b by liquid disconnects 30a, 30b which are of standard design with a ¼" flare inlet and are designed to maintain pressure in the system whenever they are not connected. Liquid disconnects 30a, 30b are known in the beverage industry as Becker plastic disconnects for general beverage use. Main feed line 52a, 52b leads to a series of feed line components, some of which may be optional depending upon the desired capabilities for the completed application system. The feed line sections connecting the feed line components are preferably composed of plastic, copper, braided steel, or other suitable tubing material which can withstand pressures of approximately 70 pounds per square inch (PSI) and temperatures of approximately 180 degrees Fahrenheit. Feed line sections can be connected to various components by use of hose barbs or compression fittings, both of which are standard in the art and which are omitted for clarity in FIG. 1.

Main feed lines 52a, 52b are connected to filters 54a, 54b which have a removable screen to allow any foreign debris present in the solutions in tanks 20a, 20b to be removed from the line before encountering later feed line components where the debris might lodge and block liquid passage. There is no other special requirement for filters 54a, 54b other than they be compatible with the other feed line components.

Inline heaters 56a, 56b of standard design may be inserted into the feed line to heat component solutions before mixing. Such inline heaters may have reservoirs of up to a quart of liquid and are thermostat controlled to allow selective control of liquid temperature. A thermostat also prevents the liquid from overheating when the system user ceases use of the system for a period of time. For application systems for use in household environments, it has been found that the electrical requirements for the application system should not exceed approximately 2000 watts; higher electrical demands will increase the occurrence of tripping circuit breakers and blowing fuses. This requirement places a practical limit of the size of the inline heaters not to exceed 1000 watts each. For most tasks, the component fluids are heated to temperatures as much as 180 degrees, but it has been found in practice that such heated solutions are not always necessary. Such inline heaters are of standard design known to the industry and are commonly provided by such companies as Watlow Electric Manufacturing Company, St. Louis, Mo.

Tees 57a, 57b may be optionally inserted into the feed line to permit use of tank 20a or tank 20b by a second operator, by attaching the applicator hose to quick disconnects 58a, 58b of standard industry design. Such quick disconnects allow rapid attachment and detachment of the hose and contain a one-way valve to maintain line pressure when no hose is connected.

Check valves 59a, 59b are located in the feed line immediately before entry into the mixing means and are necessary for the proper operation of the application system. They are standard design one-way valves known to the industry and require approximately one pound of pressure differential to operate the valve. They are generally configured with male-male or male-female threaded ends and with or without a centrally positioned nut to facilitate insertion into other components such as compression tees, although other one-way valve types may be used without departing from the spirit of-the invention. The preferred embodiment uses a check valve with male-male threaded ends and with a centrally positioned nut.

The mixing means is used to mix the cleaning solution components from tanks 20a and 20b. Although any of a number of systems may be used to mix the two component solutions evenly and consistently may be used as the mixing means without departing from the nature of the invention, the preferred means consists of a single compression tee 60 having ports 61, 62 and 63. A tee fitting was chosen because it is simple in construction, easily obtainable, and features opposed ports which ensures thorough mixing of the input solutions. Solutions from the tanks 20a and 20b are introduced through the opposed ports 61 and 62, respectively. The mixed and prepared cleaning solution is made available at port 63. Another compression tee 64 having quick disconnects 66 and 65 attached to two of its ports is optionally connected to port 63 when it is desired to provide the capability for two operators to use the prepared cleaning solution produced by the application system. A quick disconnect is used in place of compression tee 64 when a two operator capability is not important. Other devices having a single input with a multiple output, such as a "Y" connector, may be used in place of compression tee 64 without departing from the invention, as long as each of the multiple output ports features a quick disconnect or some other type of valve to maintain internal pressure of the system. In practice, the mixing means is attached to the rear of frame 100 (FIG. 3) for convenience so that it does not obstruct easy and rapid removal of tanks 20a, 20b.

Use of a compression tee for the mixing means assumes that the application system supports only two tanks. When three or more tanks are required, a special fitting (not shown) could be used, in which each input port is equally spaced radially about the inner end of the output port. Such a fitting is not readily available and would have to be custom manufactured. Several compression tees and "Y" fittings could also be sequentially assembled in a serial fashion to provide the necessary input ports. Other fittings such as a cross fitting might also be used. Such an assembly would not provide as optimal a mixing process as the equidistant radial design, but it would be sufficient when precision combination of the component solutions is not critical.

During operation by a single operator, an applicator is connected to a quick disconnect configured to port 63 of compression tee 60. Any standard spray wand, extraction tool, or similar device can be used as an applicator, and such applicators may be found at any of a number of suppliers, e.g. Jon-Don, Inc, Roselle, Ill.; Powr-Flite, Ft. Worth, Tex.; Bridgepoint Cleaning Network, Salt Lake City, Utah; Kleenrite, Inc., Albuquerque, N. Mex.; Tennent Company, Tennent, N.J.; etc. If the apparatus is to be operated with a single premixed cleaning solution, then both tanks 20*a*, 20*b* are filled with the same solution. If the apparatus is to be operated to dispense a cleaning solution having two separate component solutions, then tank 20*a* is filled with one component solution and tank 20*b* is filled with the other component solution. Compressor 70 pressurizes the system to approximately 70 pounds per square inch (psi), but no flow of solutions is produced since all pressure within the system is equal. Then the operator triggers the applicator, pressure at port 63 of compression tee 60 is suddenly reduced to ambient pressure, which causes a pressure differential of 70 psi at check valves 59*a*, 59*b*. Both valves immediately open, resulting in equal flow of component solutions into compression tee 60 where the force of flow thoroughly mixes the solutions to produce the prepared solution at port 63. When the operator releases the trigger on the applicator, the pressure at port 63 rapidly builds up to 70 psi and check valves 59*a*, 59*b* close so that the component solutions do not mix further.

As operation proceeds, liquids from both tanks are mixed in equal proportions at the mixing means until all liquid from one of the tanks is expended. When this event occurs, all flow of component solutions as well as the prepared solution ceases, although the remaining tank still contains an amount of a component solution. This result can be explained by the fact that when the applicator is triggered to demand prepared solution and one tank, say tank 20*a*, is empty and tank 20*b* still contains an amount of component solution, all compressed air produced by compressor 70 flows unobstructed through tank 20*a*, check valve 59*a*, compression tee 60, and port 63, and the applicator, resulting in reduced pressure in lines 76*a* and 76*b*. This reduces the pressure within the system to approximately that of ambient air which is insufficient to force the component solution in tank 20*b* through the system. The result is that all liquid flow ceases when the applicator connected to port 63 demands more prepared solution. Mixing ceases because air pressure is diverted from the remaining tank when the application tool demands prepared solution. When a tank runs dry, it can simply and rapidly be replaced without powering down compressor 70 or depressurizing the system. Operation is then continued until the other tank runs dry.

The unobvious advantage to this arrangement is that the contents of tanks 20*a* and 20*b* do not have to contain equal amounts to ensure equal mixing of component solutions in the mixing means. System operation ensures that when one component solution is unavailable, then flow of the remaining solution cannot occur. The operator spends less time preparing measured amounts of solution and in changing empty containers. Furthermore, either tank may be removed from the system without reducing system internal pressure, since each tank is connected to the feed means by liquid disconnects 30*a*, 30*b* connected to valves 35*a*,35*b*, respectively, and to the compressed air source by gas disconnects 40*a*, 40*b* connected to valves 45*a*, 45*b*, respectively.

Another unobvious advantage of the closed, pressurized system employed by the invention is seen in the use of carbonating cleaners, where the two component solutions, when combined, produce carbon dioxide which effervesces when it is applied to a surface to be cleaned. Some prior art requires that the component solutions be heated to increase the reactivity of the component solutions. The pressurized system of the invention has been observed to retain the carbon dioxide in solution until the pressure is released, regardless of the temperature of the component solutions. Thus, although the invention provides for the addition of inline heaters to heat the component solutions when producing a self-carbonating cleaning preparation, the invention may be used without heating and still retain the self-carbonating quality of the preparation.

While only a preferred embodiment has been illustrated and described, obvious modifications may be made within the scope of this invention and the following claims without substantially changing its functions. Accordingly, the scope of the invention should be determined not by the embodiments illustrated but by the appended claims and their legal equivalents.

The invention claimed is:

1. An apparatus for producing a prepared cleaning solution consisting of one or more component solutions, the apparatus adapted for use with an applicator for delivery of the prepared solution to a location proximate to a surface to be cleaned, the applicator having an open state for delivery of the prepared solution to the surface and a closed state for prevention of delivery of the prepared solution to the surface, the apparatus comprised of:

a. a plurality of tanks supported by a mobile base, each tank containing one of the component solutions, each tank having a liquid outlet valve and a gas inlet valve, wherein each valve allows a connection to be made to the valve which may be rapidly removed without tools and in which pressurization is maintained in the tank when the connection is removed from the valve;

b. a mixing means for receiving each component solution and combining the component solutions to create the prepared solution for presentation to the applicator;

c. a feed means connecting the tanks to the mixing means; and, d. a pressurization means in direct simultaneous communication with each tank to maintain elevated and equal pressure therein and in both the feed means and mixing means therethrough, the pressurization means being capable of rapid disconnection from each tank, the elevated pressure being sufficient to urge each component solution through the feed means to the mixing means with sufficient energy to promote thorough mixture of the component solutions within the mixing means when the applicator is in an open state.

2. The apparatus described in claim 1, wherein the mixing means comprises a tee connector having two opposed inlet ports and an outlet port, each said inlet port in communication with one tank and the outlet port providing the prepared solution to the applicator.

3. The apparatus described in claim 1, wherein the feed means comprises a directional check valve associated with each component solution, wherein flow of the component solution from tank holding the component solution to the mixing means is uninhibited and flow of the component solution from the mixing means to the tank holding the component solution is inhibited.

4. The apparatus described in claim 1, wherein the feed means is comprised of at least one inline heater.

5. The apparatus described in claim 1, wherein said pressurization means comprises an air compressor.

6. The apparatus described in claim 5, wherein the pressurized air produced by the compressor is in direct communication with every tank, whereby equal and constant pressure is provided thereto.

7. The apparatus described in claim 6, wherein the compressor maintains a constant and equal pressure by means of a blow-by valve.

8. The apparatus described in claim 1, wherein the feed means comprises a liquid disconnect configured for removable attachment to the liquid output valve, whereby the liquid disconnect may be rapidly removed from the liquid outlet valve without using tools so that, during and after removal, pressure is maintained within the tank.

9. The apparatus described in claim 1, wherein the pressurization means comprises a gas disconnect configured for removable attachment to the gas inlet valve of the tank, whereby the gas disconnect may be rapidly removed from the gas inlet valve without using tools so that, during and after removal, pressure is maintained within the tank and within the pressurization means.

10. A pressurized cleaning solution application apparatus for preparing a cleaning solution consisting of one or more component solutions, the apparatus adapted for use with an applicator for delivery of the solution to a location proximate to a surface to be cleaned, the applicator having an open state for delivery of the solution to the surface and a closed state for prevention of delivery of the solution to the surface, the apparatus comprised of:

a. a mobile frame having a plurality of wheels and a handle, the frame supporting a plurality of pressurized tanks, each tank each holding a component solution of the prepared solution, each tank with an input gas valve and an output liquid valve;

b. a mixing means having a plurality of input ports and a single output port, the output port providing the prepared solution to the applicator, the prepared solution resulting from mixture within the mixing means of the component solutions;

c. a plurality of feed lines, a selected feed line connecting the output liquid valve associated with a selected tank to a selected input port and placing the component solution contained therein in communication with the mixing means without permitting any component solution to come in contact with any other component solution beforehand, the selected feed line attached to the output liquid valve of the selected tank with a liquid disconnect; and, d. a pressurization means connected to the input valve of each tank with a gas disconnect to maintain elevated and equal pressure therein, the elevated pressure being sufficient to urge each component solution through the feed lines to the mixing means with sufficient energy to promote thorough mixture of the component solutions within the mixing means when the applicator is in an open state.

11. The apparatus described in claim 10, wherein each feed line contains a check valve permitting flow of the component solution from the tank to the input port and preventing flow of the component solution from the input port to the tank, for the tank and input port associated with the feed line.

12. The apparatus described in claim 10, wherein one or more feed lines contain a tee fitting with a quick disconnect, whereby a second applicator may be connected to the apparatus.

13. The apparatus described in claim 10, wherein the apparatus is comprised of two pressurized tanks.

14. The apparatus described in claim 10, wherein at least one feed line comprises an inline heater.

15. An apparatus for providing a prepared solution consisting of mixing a first component solution and a second component solution, the apparatus adapted for use with an applicator for delivery of the prepared solution to a location proximate to a surface to be cleaned, the applicator having an open state for delivery of the prepared solution to the surface and a closed state for prevention of delivery of the prepared solution to the surface, the apparatus comprised of:

a. a pressurized first tank with a gas input valve and a liquid output valve, the first tank containing the first component solution;

b. a pressurized second tank with a gas input valve and a liquid output valve, the second tank containing the second component solution;

c. an air compressor removably connected to the gas input valve of the first tank and to the gas input valve of the second tank, whereby the compressor is configured to provide air at elevated and equal pressure to both tanks for urging the contents therefrom;

d. a mixing means having an output port and first and second input ports, the first input port removably connected to the first tank with a first inline heater interposed therebetween, the second input port removably connected to the second tank with a second inline heater interposed therebetween;

e. a quick disconnect means fixedly connected to the output port to allow removable connection to the applicator, the quick disconnect means maintaining pressure within the mixing means when the applicator is disconnected; and, f. a mobile base supporting the tanks and the mixing means for portable transportation about a work site;

wherein equal amounts of component solutions flow from their respective tanks to the mixing means where they are mixed to form a prepared solution which flows under pressure to the applicator when the applicator is in the open state; and when one of the two tanks becomes empty, flow to the applicator ceases when the applicator is in the open state.

16. The apparatus described in claim 15, wherein the mixing means comprises a tee connector having two opposed inlet ports and an outlet port, each said inlet port in communication with one tank and the outlet port providing the prepared solution to the applicator.

17. The apparatus described in claim 15, wherein a tee having two opposed inlet ports and an outlet port to which is fixedly attached a quick disconnect is interposed between a selected check valve and its associated tank to make the component solution contained in the associated tank available for external use before it is mixed with the other component solution.

18. The apparatus described in claim 15, wherein a check valve is interposed between the first input port and the first tank.

19. The apparatus described in claim 15, wherein a strainer is interposed between the first input port and the first tank.

* * * * *